United States Patent
McKelvey

(10) Patent No.: US 7,506,843 B2
(45) Date of Patent: Mar. 24, 2009

(54) COMPUTER MONITOR SUPPORT DEVICE FOR A VEHICLE

(76) Inventor: Richard L. McKelvey, 9284 Beaver Shores Rd., Rogers, AR (US) 72756

(*) Notice: Subject to any disclaimer, the term of this patent is extended or adjusted under 35 U.S.C. 154(b) by 202 days.

(21) Appl. No.: 11/416,827

(22) Filed: May 3, 2006

(65) Prior Publication Data

US 2006/0249632 A1    Nov. 9, 2006

Related U.S. Application Data

(60) Provisional application No. 60/677,155, filed on May 3, 2005.

(51) Int. Cl.
*G12B 9/00* (2006.01)

(52) U.S. Cl. .............. 248/27.1; 248/609; 296/37.12; 224/483; 224/540; 361/681; 361/686

(58) Field of Classification Search ............. 248/27.1, 248/27.3, 608, 609, 616, 599, 601, 632; 296/37.8, 296/24.1, 37.12, 37.5; 361/681, 683, 686; 224/539, 483, 540
See application file for complete search history.

(56) References Cited

U.S. PATENT DOCUMENTS

| | | | |
|---|---|---|---|
| 2,129,933 A * | 9/1938 | Hueglin ............... 416/244 R |
| 3,589,577 A * | 6/1971 | Basinger ............... 224/540 |
| 3,658,219 A * | 4/1972 | Van Ordt ............... 224/540 |
| 3,964,612 A * | 6/1976 | Skilliter et al. ............... 211/26 |
| 3,984,161 A * | 10/1976 | Johnson ............... 312/7.1 |
| 4,005,612 A | 2/1977 | Lippincott |
| 4,194,585 A | 3/1980 | Prince |
| 4,706,810 A | 11/1987 | Petrilli |
| 5,177,665 A * | 1/1993 | Frank et al. ............... 361/683 |
| D363,916 S | 11/1995 | Johnson |
| 5,555,491 A | 9/1996 | Tao |
| 5,657,958 A * | 8/1997 | McLaughlin et al. ........ 248/632 |
| 5,769,369 A | 6/1998 | Meinel |
| 5,859,762 A * | 1/1999 | Clark et al. ............... 361/686 |
| D419,519 S | 1/2000 | Whidbee |
| 6,386,413 B1 | 5/2002 | Twyford |
| 6,400,560 B1 | 6/2002 | Chian |
| 6,428,072 B1 * | 8/2002 | Moore ............... 296/24.34 |
| 6,470,809 B1 | 10/2002 | Herbert |
| 6,581,893 B1 | 6/2003 | Lu |
| 6,644,611 B1 | 11/2003 | Tai |
| 6,663,155 B1 | 12/2003 | Malone et al. |

(Continued)

OTHER PUBLICATIONS

Havis-Shields brochure, "Consolidator: Angles Series Consoles", www.havis.com.

*Primary Examiner*—Anita M King
(74) *Attorney, Agent, or Firm*—Boyd D. Cox

(57) ABSTRACT

The computer monitor support device for a vehicle includes a console body with a monitor support body pivotally mounted on the console body. The monitor support body pivots between an upright, in-use position where a monitor supported thereon is visible and readily accessible to an operator and a downward, non-use position in which the monitor support body and attached monitor are relatively inaccessible. With the support device in the non-use position, the windshield and dashboard of the vehicle are more readily accessible. In addition, a vibration attenuator tightens the play between the monitor support body and the console body to reduce vibration and noise within the vehicle.

34 Claims, 10 Drawing Sheets

U.S. PATENT DOCUMENTS 6,719,343 B2 4/2004 Emerling et al.
7,097,082 B2 * 8/2006 Wallaker .................... 224/483
7,121,514 B2 * 10/2006 Twyford ................... 248/177.1
2001/0042812 A1 * 11/2001 Perzewski .................. 248/27.1

* cited by examiner

COMPUTER MONITOR SUPPORT DEVICE FOR A VEHICLE

BACKGROUND

The present invention is drawn to a support device for supporting a computer monitor in a vehicle. The support device can maintain the computer monitor in an upright, in-use position in which the monitor is highly visible and readily accessible to a driver and/or front seat passenger in the vehicle and alternatively can maintain the monitor in a downward, non-use position in the vehicle. The support device also includes a vibration attenuator that inhibits vibration between the structural elements of the support device thereby reducing the noise level within the vehicle driver compartment.

Police officers, public safety officers, firefighters, paramedics and other emergency responders are generally required to carry various types of equipment in their automotive vehicles. With the advent of portable computers it has become common for emergency vehicles to be equipped with a computer in addition to the other conventional equipment. As a result there has been a need for devices that can support a computer in an automotive vehicle.

Due to the nature of use in an emergency vehicle, it is critical that the computer monitor be mounted in a location that is highly visible, readily accessible and does not interfere with the vehicle occupants or the other equipment carried in the vehicle.

Computers in which the monitor is separate from the keyboard are an example of the types typically carried in emergency vehicles. Due to their configuration, conventional equipment consoles are not typically able to accommodate a computer monitor that is separate from the keyboard.

Stands for supporting a laptop computer and its components within a vehicle are known in the prior art. These stands are typically mounted separately from the console box on the floorboard in front of the passenger seat. Such an arrangement can severely impinge on the leg room of a front seat passenger and may altogether eliminate space for a front seat passenger. Furthermore, these prior art stands are configured for supporting the computer monitor with an attached keyboard and not just the monitor alone.

Mounting the monitor of a computer in a police vehicle or other emergency services vehicles can be problematic since it may often be necessary for an occupant to use the computer and/or other equipment while in transit. Due to the general size and shape, a computer monitor can take up a relatively large amount of space in a vehicle's interior. This makes it difficult to position the computer monitor in such a way that not only the monitor's screen, but also other equipment in the vehicle is highly visible and readily accessible to the driver and front seat occupant. It is desirable that the computer and other equipment carried within the vehicle be readily accessible in order to facilitate use and thereby enhance safety.

Mounting devices for supporting computer monitors in vehicles are known in the prior art. Some of these devices include articulating members and/or separable elements which can be prone to rattling due to vibrations generated by the moving vehicle. Rattling creates unwanted noise in the vehicle driver compartment. Such noise is not only bothersome and intrusive, but can also be dangerous in an emergency vehicle where clear communication is essential. Consequently, there is a need for a support device that reduces noise inside the vehicle's driver compartment.

There are additional drawbacks to supports of the prior art in that some supports are not readily visible or accessible to the vehicle's driver. Such supports are located directly adjacent to the driver, require that the driver rotate his or her upper body in order to see and access the computer and other equipment mounted in the vehicle. With the computer located substantially out of the driver's line of sight, the driver must look away from the front of the vehicle in order to see its screen. In doing so, he or she must move their eyes a significant distance away from the front of the vehicle. In a moving vehicle, the driver looking completely away from the front of the vehicle increases the chance for an accident, thereby creating danger to no only the occupants of that vehicle, but also other nearby vehicles. Therefore, it is important to have the computer monitor mounted in a location where the driver can view the screen without significantly shifting his or her line of vision from the front of the vehicle.

For accessibility, both visually and operatively, there is a need for an adjustable support device that can hold a computer monitor in selected locations so that the driver and/or passenger can easily see, reach and access the monitor. In addition, it is important that the support device and attached monitor be readily moveable to allow access to other equipment installed in the vehicle. There is also a need for a monitor support device that deters rattling and inhibits noise within the vehicle's driver compartment.

SUMMARY OF THE INVENTION

The present invention is a support device for adjustably supporting a computer monitor in a vehicle. When mounted on the support device, a computer monitor can be selectively positioned in various readily accessible and highly visible locations. The monitor can be alternately positioned in an in-use position where a monitor held thereby is highly visible and accessible and a non-use position where the monitor is positioned away from the dashboard and is not as visible or as accessible, but still in close proximity to the driver. The support device includes a monitor support body to which the monitor is attached. The monitor support body is pivotally mounted on a console body which generally sits on the floor or on a floor mounted bracket support in the vehicle's driver compartment. The monitor support body is readily moveable between the upright, in-use position and the downward, non-use position.

In the in-use position, the monitor is disposed above the console body and is generally aligned near the driver's front facing line of sight. The vibration attenuator is mounted on the console body and is wedged against the monitor support body to reduce rattling.

To move to the non-use position, the monitor support body is pivoted away from the dashboard until it is proximate the front of the console body and the mounting bracket is resting on another portion of the vibration attenuator mounted on the console body. In this position the monitor's screen is generally facing downwardly towards the vehicle floor.

It is an object of the present invention to provide a support device for a computer monitor in a vehicle that is adjustable.

It is a further object of the present invention to provide a support device for a computer monitor in a vehicle driver compartment in which a monitor supported thereon is readily accessible to the driver.

It is a further object of the present invention to provide a console body with a pivotable mounting bracket that adjustably supports a computer monitor.

It is a further object of the present invention to provide a support device for mounting a computer monitor in a vehicle driver compartment wherein the monitor can be positioned for use near the driver's forward line of vision.

It is a further object of the present invention to provide a console body with a pivotable mounting bracket for supporting a computer monitor above the console body such that there is a low clearance between the top of the console body and the mounting bracket.

It is a further object of the present invention to provide a support device for mounting a computer monitor in an automotive vehicle wherein the device does not interfere significantly with the front passenger's seating and leg room area in the vehicle.

It is a further object of the present invention to provide a support device for a computer monitor in which the monitor's screen can be adjusted for viewing by the vehicle driver and/or the front seat passenger.

It is a further object of the present invention to provide a support device for a computer monitor wherein the monitor is easily accessible to the driver and/or a front seat passenger in the vehicle.

It is a further object of the present invention to provide a support device for a computer monitor for use in an automotive vehicle in which the supported monitor can be readily pivoted between non-use and in use positions by a driver seated in the vehicle.

It is a further object of the present invention to provide a computer monitor support for a vehicle wherein the support and monitor can be disposed proximate the dashboard during use and can be readily pivoted away from the dashboard allowing access to the dashboard when desired.

It is a further object of the present invention to provide a support device for a computer monitor in a vehicle driver compartment in which the computer monitor is located forward of the front seats when in use.

It is a further object of the present invention to provide an adjustable support device for mounting a computer monitor in an automotive vehicle in which the support device has a vibration attenuator that inhibits rattling of the device.

It is a further object of the present invention to provide a vibration attenuator that inhibits noise on an articulating support device mounted in the driver compartment of an automotive vehicle.

It is a further object of the present invention to provide a support device for a computer monitor in the driver compartment of a vehicle wherein the supported monitor can be adjusted to various selected viewing positions.

It is a further object of the present invention to provide a support for a computer monitor in an automotive vehicle that allows the monitor to be moved between an upright position and a downward facing position.

It is a further object of the present invention to provide a support device for a computer monitor in an automotive vehicle wherein the monitor can be adjusted to selected positions at varying distances to the dashboard.

BRIEF DESCRIPTION OF THE FIGURES

Reference is made to the accompanying drawings in which are shown illustrative embodiments of the invention and from which novel features and advantages will be apparent.

DETAILED DESCRIPTION

Figure 1:
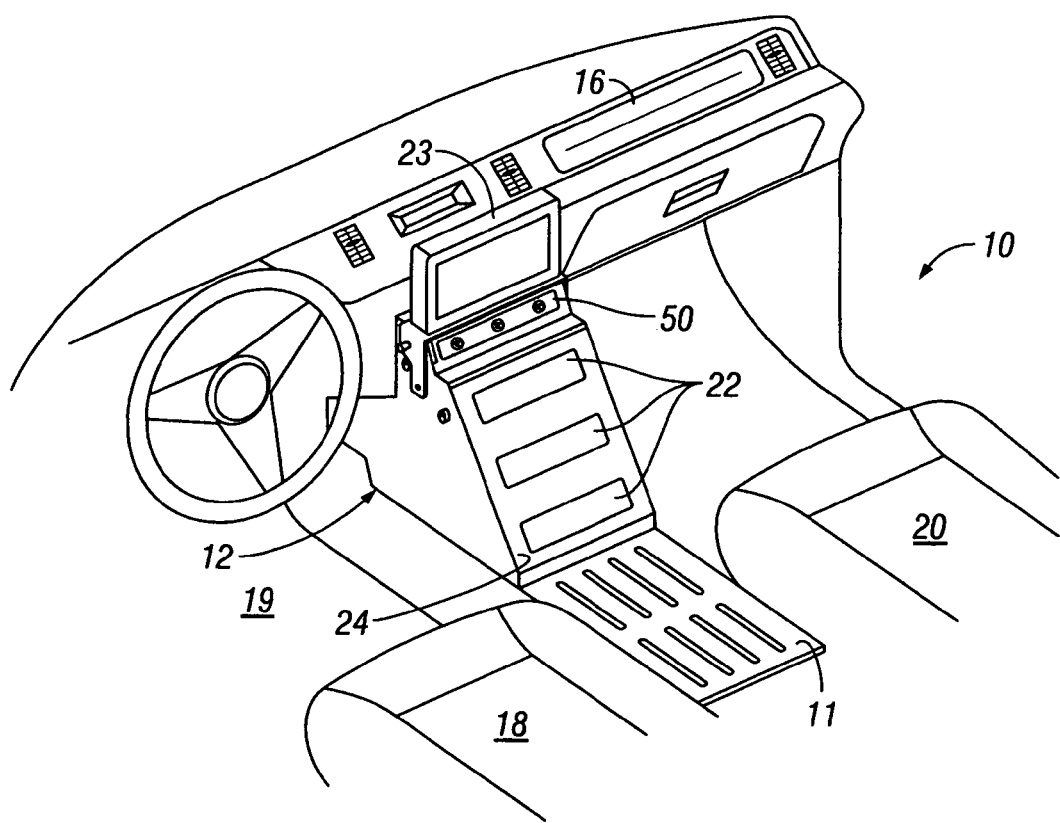
FIG. 1 is a front perspective view of a driver compartment of a vehicle including a support device according to the present invention showing a computer monitor and other equipment supported thereby.

Referring to FIG. 1, the support device 12 of the present invention is shown installed in the driver compartment 10 of an automotive vehicle. The support device 12 can be provided as an after market unit that can be retrofitted to the driver compartment 10 of an existing vehicle. The support device 12 may be installed in different types of vehicles and is particularly useful in vehicles used by police and public safety officers, firefighters and other emergency responders requiring nonstandard electronic equipment in their automotive vehicle.

The interior of a typical automotive vehicle in which the support device 12 of the present invention is shown comprises a driver compartment 10 which includes a dashboard 16 having a climate control panel 50. Also included in the vehicle's driver compartment 10 are a driver seat 18 and a front passenger seat 20.

The support device 12 is preferably installed in a central region of the driver compartment 10 in the area between the driver 18 and front passenger 20 seats and between the front edges of the seats 18, 20 and the dashboard 16. Multiple pieces of equipment 22 may be mounted on the support device 12, including a radio, siren controls, light bar controls, computer and other equipment that is typically used in police or emergency vehicles.

The support device 12 is located in the driver compartment 10 to enable easy access by occupants in the driver seat 18 and/or the front passenger seat 20. In this location, the support device 12 and computer monitor 23 mounted thereon do not significantly interfere with the movements of the vehicle occupants but are readily accessible. The support device 12 can be selectively adjusted to enhance visibility of the monitor's screen and can be repositioned to allow better access to the dashboard 16 and other equipment in the vehicle driver compartment 10.

Figure 2:
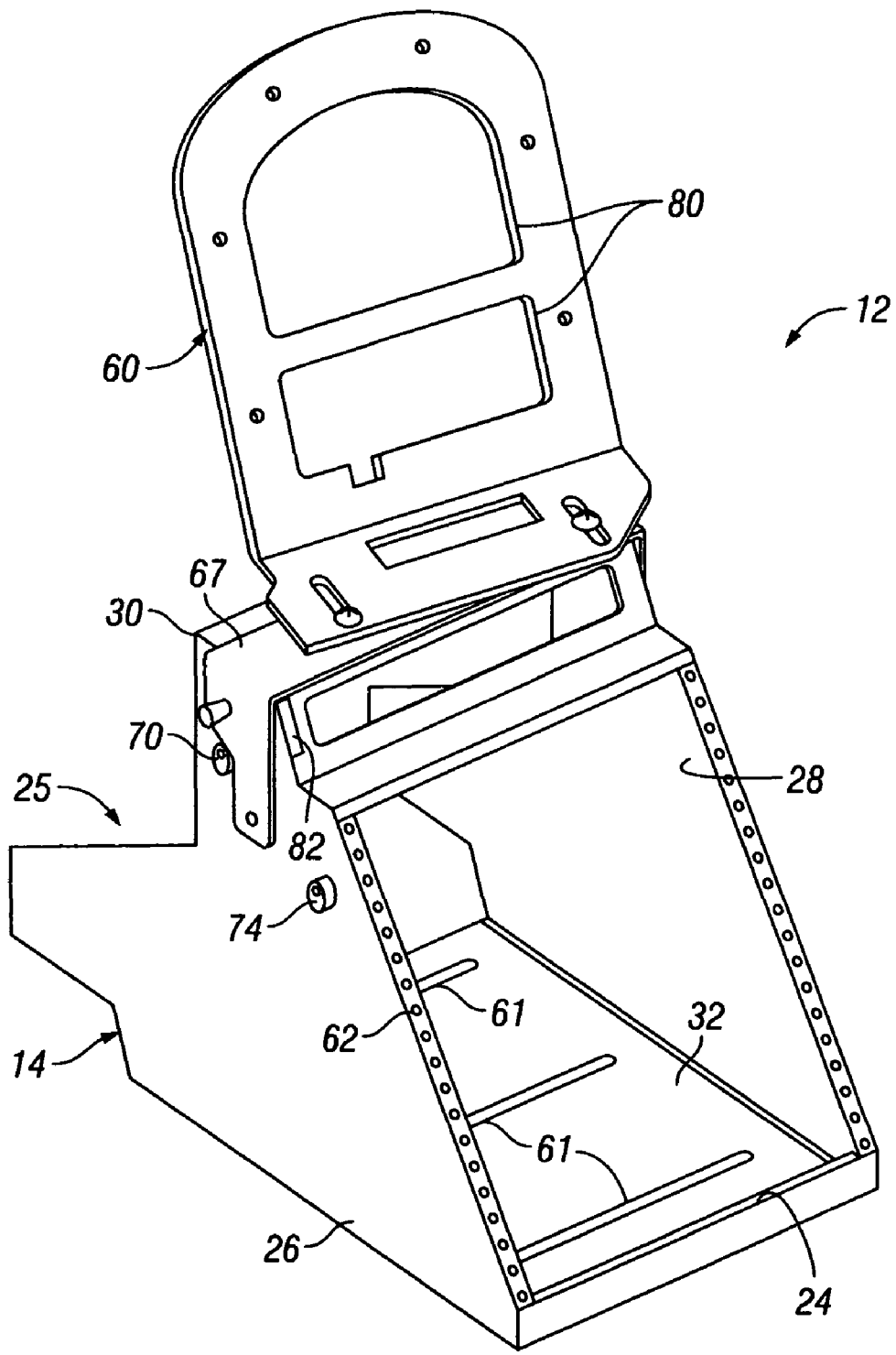
FIG. 2 is a front perspective view of the support device of FIG. 1 with the monitor support body disposed in the in-use position.

As shown in FIGS. 1 and 2, the support device 12 includes a monitor support body 60 and a console body 14. The console body 14 includes sides 26, 28, top 30, bottom 32, front 24 and back 25. The bottom 32 includes openings 61 and is adapted to be secured to the driver compartment 10 of the vehicle.

Figure 7:
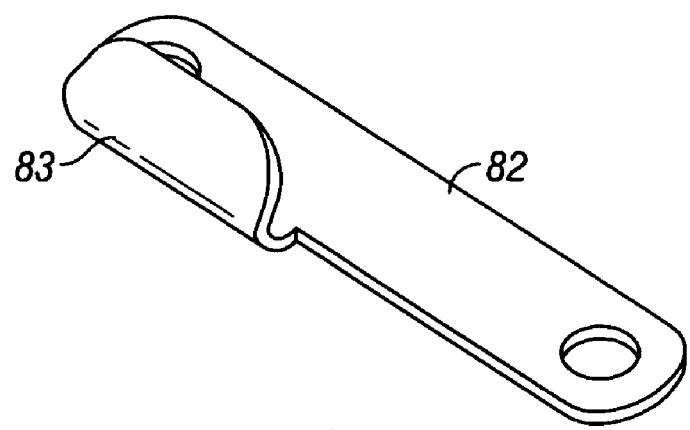
FIG. 7 is a perspective view of the latch ramp on the support device of FIG. 1.

A latch ramp 82 as shown in FIGS. 2 and 7 is mounted on the front of the console body 14 and includes an angled face 83 which projects outwardly from the front of the console body 14.

The monitor support body 60 includes means for mounting the monitor support body to the console body and means for holding a computer monitor. In a preferred embodiment shown in FIGS. 2 and 3, the means for mounting the monitor support body to the console body is a monitor mounting bracket 63 which is pivotally attached to the console body 14. The means for holding a computer monitor is an L-shaped holder 64 and is adjustably attached to the mounting bracket 63. A computer monitor 23 can be mounted onto the holder 64.

The monitor mounting bracket 63 comprises a U-shaped yoke 65 formed by a pair of legs 66 and a cross member 67. A pair of mounting apertures 86 are comprised by the cross member 67 of the yoke 65. A pivotal attachment comprising a pair of pivot joints 68 secures the mounting bracket 63 to the console body 14. One leg 66 of the yoke 65 is disposed adjacent to the console body 14 and is attached to the side of the console body 14 by one of the pivot joints 68. The other leg 66 of the mounting bracket 63 is also disposed adjacent to the opposite side 28 of the console body 14 and attached by the other pivot joint 68. Preferably, each of the pivot joints 68 comprises a pivot pin. The yoke 65 pivots about an upper portion of the console body 14.

Figure 3:
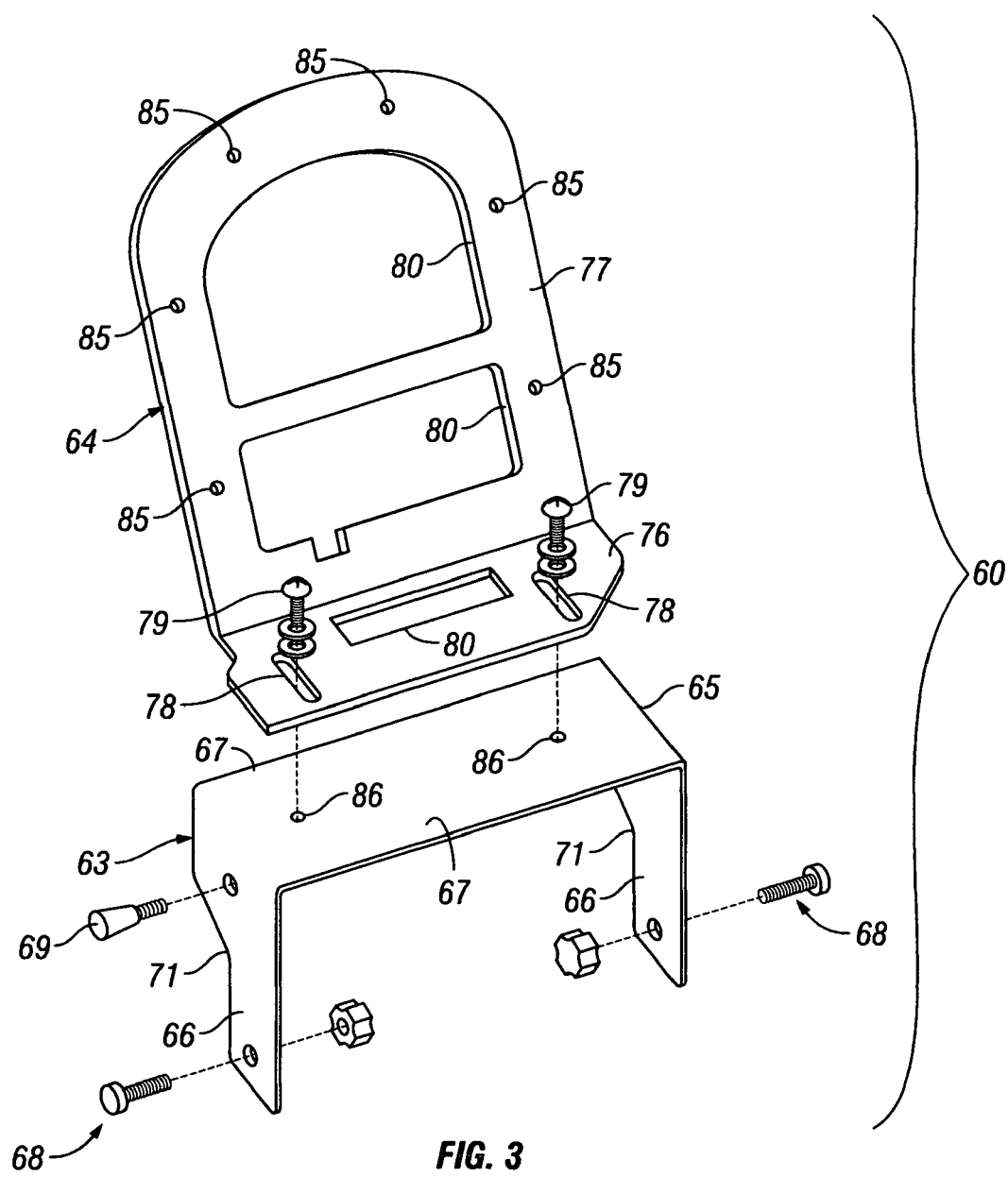
FIG. 3 is an exploded view of the monitor support body of the support device according to the present invention shown in FIG. 1.

The L-shaped holder 64 includes a base 76 and a back 77, as shown in FIG. 3. The back 77 extends outwardly from the base 76 at a preferred angle of about 108 degrees to form the general L-shape of the holder 64. Although the preferred angle between the base 76 and the back 77 is approximately 108 degrees, the angle between the base 76 and back 77 can vary.

A plurality of mounting holes 85 are means for attaching the computer monitor to the holder 64.

In the preferred embodiment of FIG. 1, the base 76 has means for pivotally attaching the holder 64 to the mounting bracket 63 which includes a pair of arcuate base slots 78 and corresponding base fasteners 79. The arcuate base slots 78 are disposed on the base and are adapted to receive a respective base fastener 79 in each base slot 78. Each of the base fasteners 79 extends through an arcuate base slot 78 and engages a mounting aperture 86 to attach the L-shaped holder 64 to the cross member 67 of the mounting bracket 63.

The position of the L-shaped holder 64 on the mounting bracket 63 can be adjusted to various positions. The holder 64 can be rotated from side to side relative to the mounting bracket 63 in order to change the viewing angle of the back 77 and a monitor supported thereon. The holder 64 can also be adjusted by sliding it forward or backward on the mounting bracket 63. When the support device 12 is installed and disposed in the in-use position, the distance between the L-shaped holder 64 and the dashboard 16 of a vehicle can be changed. By loosening the base fasteners 79, the L-shaped holder 64 can be moved to different positions. Once the holder 64 is in the selected position, the base fasteners 79 are then tightened to secure the holder 64 in position on the mounting bracket 63. In addition, access openings 80 on the back 77 of the L-shaped holder 64 provide means for attaching a computer monitor to the holder 64.

Figure 8A:
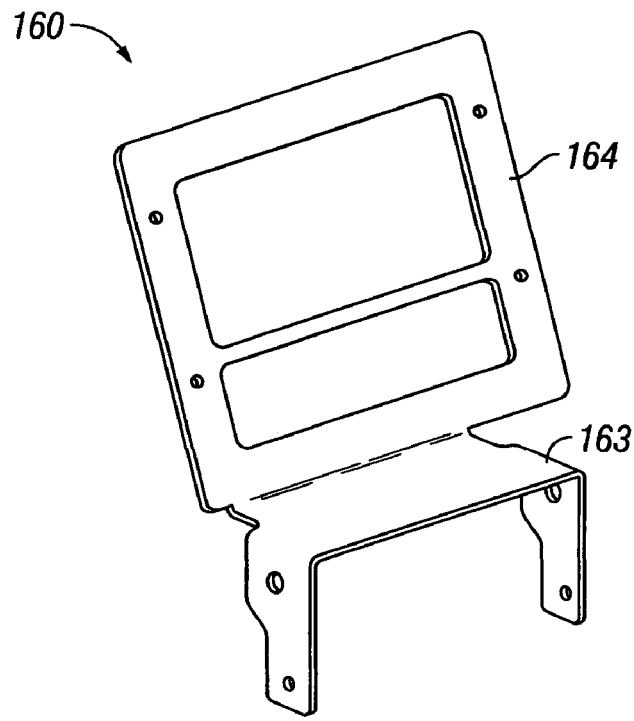
FIGS. 8A-8B are perspective views of respective second and third preferred embodiments of an integrally formed monitor support body.
Figure 8B:
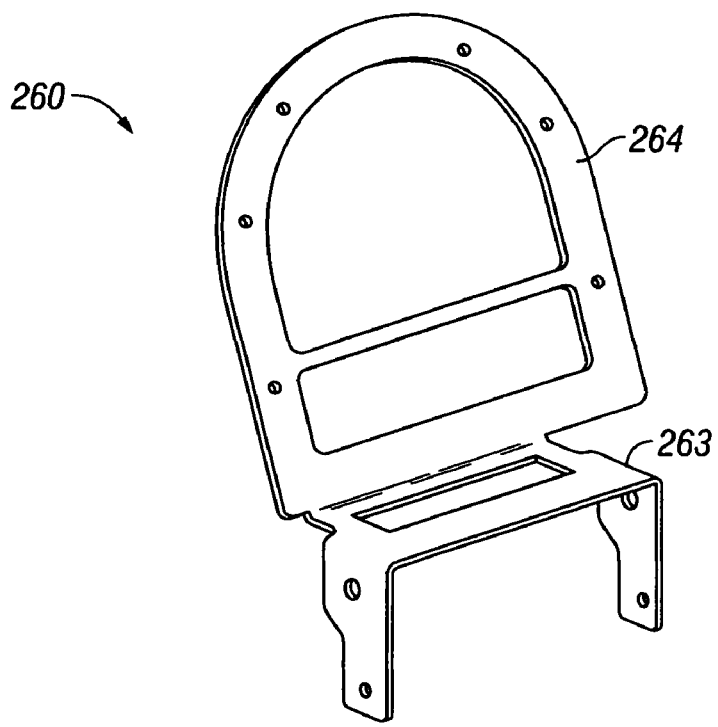

Although the holder 64 and the mounting bracket 63 of the preferred embodiment are separate elements adjustably attached to each other, they could be formed as an integral element as shown in the alternate embodiments of FIGS. 8A and 8B. In these modified embodiments, adjustment of the holder 64 would be more limited than that of the preferred embodiment disclosed in the figures.

In FIG. 8A, there is shown a second embodiment of the monitor support body 160 which comprises a holder 164. The holder 164 is integrally attached to a mounting bracket 163. The mounting bracket 163 is pivotally attached to the console body in the same manner as described in the first preferred embodiment of FIGS. 1-5.

Similarly, a third embodiment as shown in FIG. 8B includes a monitor support body 260 having a holder 264 and a mounting bracket 263. The holder 264 is integrally attached to the mounting bracket 263 which is pivotally attached to the console body in the same manner as the first and second preferred embodiments.

Figure 4:
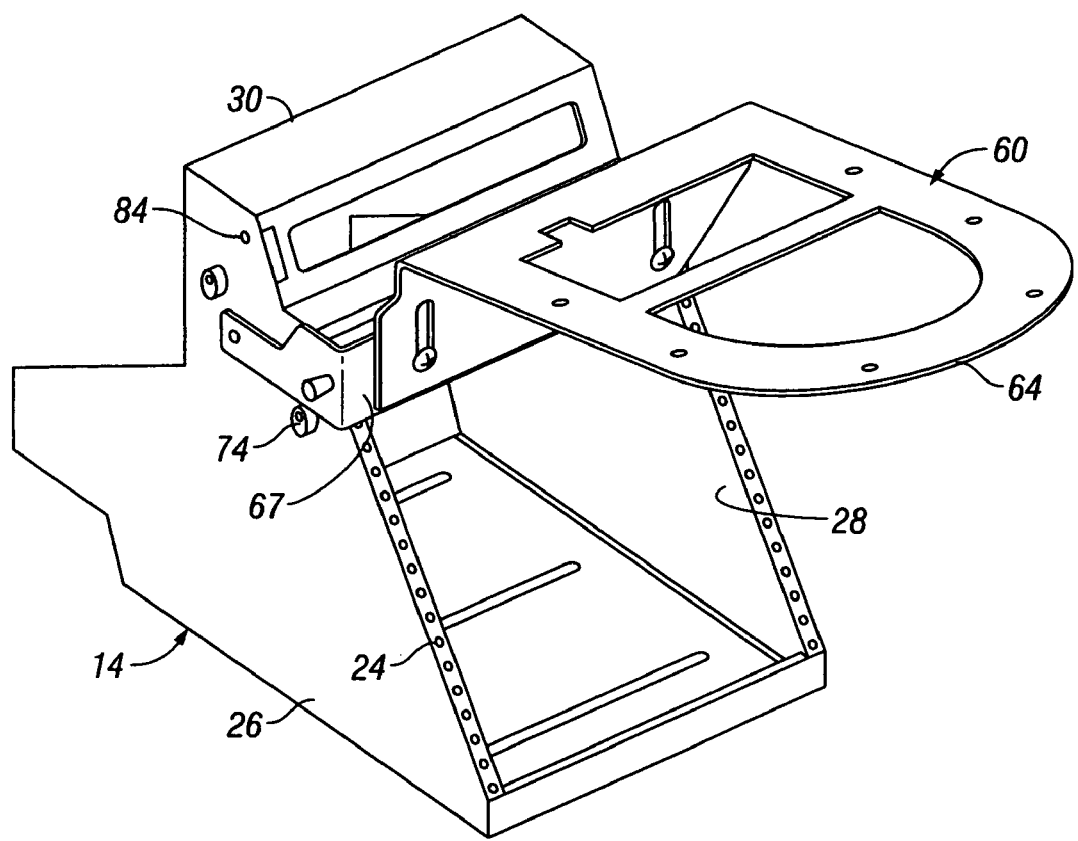
FIG. 4 is a front perspective view of the support device according to the present invention shown in FIG. 1 with the monitor support body disposed in the non-use position.

Alternate configurations of the support device 12 are defined by the relative position of the monitor support body 60 on the console body 14. Particularly, the configurations comprise an upright, in-use position and a downward, non-use position as shown in FIGS. 2 and 4, respectively.

In the upright, in-use position the L-shaped holder 64 is disposed substantially above the console body 14. Also in this position, the back 77 of the L-shaped holder or the screen of a mounted computer monitor would face outwardly toward the occupants seated in the vehicle. The cross member 67 is positioned proximate the top 30 of the console body 14 with relatively little clearance between the top 30 of the console body 14 and the cross member 67 and the mounting bracket is disposed against the upper elastomeric bushings 70. This arrangement reduces the overall height of the support device 12 and thereby reduces the overall obstruction to the dashboard 16 and windshield that may be created when the monitor support body 60 is in the in-use position.

In the downward, non-use position the monitor support body 60 is adjacent to the front 24 of the console body 14. Additionally, the back 77 of the holder 64 and the screen of a mounted computer monitor is facing downwardly toward the bottom 32 of the console body 14.

When the support device 12 is disposed in the in-use position as shown in FIG. 2, a computer monitor mounted on the monitor support body 60 is accessible to an operator seated in either of the driver seat 18 or the front passenger seat 20 of the vehicle's driver compartment 10. To move the support device 12 from the in-use position to the non-use position, the holder 64 is pivoted toward the front 24 of the console body 14 and downwardly until the cross member 67 is in front of the console body 14. In the non-use position, the cross member 67 and holder 64 overlay a portion of the front 24 of the console body 14. The screen of a monitor 23 mounted on the holder 64 is less visible to vehicle occupants in the non-use position than in the in-use position. However, in the non-use position, the support device 12 allows the windshield to be more visible and the dashboard 16 in the vehicle to be more visible and accessible to occupants in the driver compartment.

When the support device 12 is in the in-use position, a portion of the dashboard 16 may be obstructed by the holder 64 and monitor 23 mounted thereon. The monitor 23 is highly visible and readily accessible. In addition, the console body 14 and equipment mounted in the console body are readily accessible.

Therefore, to access portions of the dashboard 16 that might be obstructed by the support device 12 and the computer monitor, the holder 64 can be pivoted to the non-use position which is down and away from the dashboard 16. Conversely, to access the equipment mounted in the console body 14, the holder 64 can be pivoted, moving the support device 12 into the in-use position, and allowing access to the console body's equipment.

Figure 5:
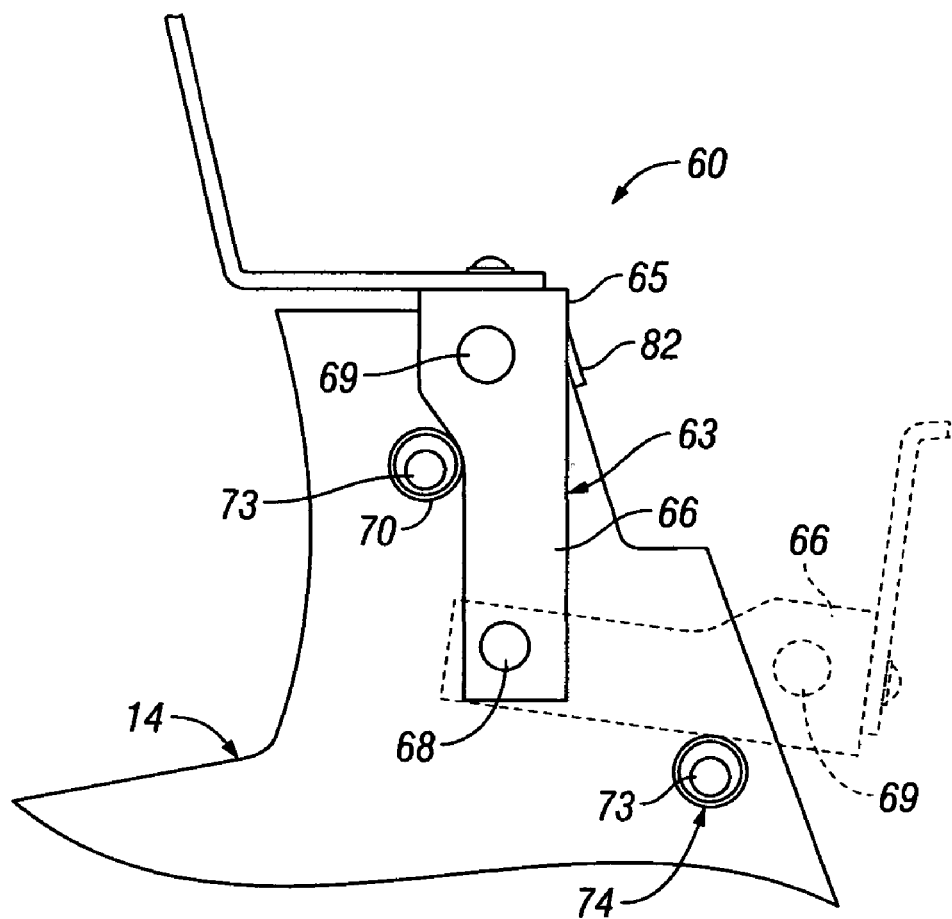
FIG. 5 is a partial side view of the support device of FIG. 1 showing the monitor support body disposed in the in-use position by the solid lines and I the non-use position by the dotted lines.

Referring to FIGS. 3 and 5, a lock mechanism secures the holder 64 in the in-use position. In the preferred embodiment, the lock mechanism includes a spring-loaded plunger 69 and a locking aperture 84. The spring-loaded plunger 69 releasably engages with the locking aperture 84 in the side of the console body 14 to secure the holder 65 in the in-use position. Alternately, the spring-loaded plunger 69 can be disengaged from the locking aperture 84, thereby releasing the monitor support body 60 to move. When moving, the monitor support body 60 pivots about the console body 14 via the pivot joints 68 and a computer monitor supported thereon can be moved relative to the console body 14.

When engaged with the locking aperture 84, the spring-loaded plunger 69 releasably locks the mounting bracket 63 along with the attached L-shaped holder 64 in an upright, in-use position. The spring-loaded plunger 69 can be released from the locking aperture 84 by drawing the plunger away from the console body 14. When the plunger 69 is released from the locking aperture 84, the yoke 65 is then allowed to pivot about the console body 14.

Figure 6:
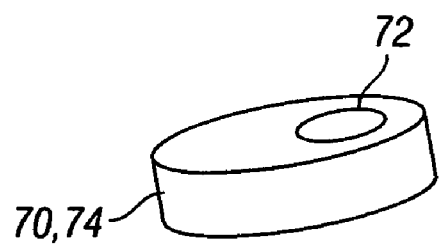
FIG. 6 is a perspective view of an elastomeric bushing comprised by the vibration attenuators on the support device of FIG. 1.

The support device 12 includes means for deterring vibrations which is a vibration attenuator that reduces vibrations between the console body 14 and the monitor support body 60 of the support device 12. The vibration attenuator comprises a plurality of snubbers which are mounted on the console body 14 to selectively engage the monitor support body 60. The snubbers include a pair of upper elastomeric bushings 70 and a pair of lower elastomeric bushings 74, as shown in FIGS. 3, 5 and 6. A respective upper elastomeric bushing 70 and a lower elastomeric bushing 74 is mounted on each side 26, 28 of the console body 14. Each leg 66 on the yoke 65 of the mounting bracket 63 has a notch 71. The notch 71 receives a corresponding upper elastomeric bushing 70 therein when the monitor support body 60 is in the in-use position.

As the mounting bracket 63 is pivoted into the upright, in-use position, the plunger 69 passes across the angled face 83 on the latch ramp 82. The angled face 83 of the latch ramp 82 gradually depresses the end of the plunger 69 as the mounting bracket 63 is moved towards an upright orientation in the in-use position. The end of the plunger 69 is adapted to engage the locking aperture 84 on the console body 14. Once the spring-loaded plunger 69 has passed completely across the latch ramp 82, the end of the plunger 69 remains depressed against the console body 14 until the plunger 69 is positioned over the locking aperture 84. At this point, the end of the plunger 69 springs into the locking aperture 84 and thereby locks the monitor support body 60 in its upright, in-use position with the legs 66 of the yoke 65 preferably pressing on the respective upper elastomeric bushings 70.

Each of the upper 70 and lower 74 elastomeric bushings is cylindrically-shaped and includes a bushing aperture 72 extending therethrough as shown in FIG. 6. The bushing aperture 72 is offset from a center of the bushing 70, 74. Each of the bushings 70, 74 is attached to the console body 14 by a mounting pin 73 which extends through the bushing aperture 72 and fastens to the console body 14.

When the support device is locked in the in-use position, the legs 66 of the mounting bracket 63 abut a respective upper elastomeric bushing 70. A notch 71 on each leg 66 abuts the side of a respective upper bushing 70. Each upper bushing 70 can be rotated about its mounting pin 73 to vary the force of pressure exerted by the upper elastomeric bushing 70 against the respective abutting leg 66 to tighten or loosen play in the device 12. As the upper elastomeric bushing 70 is rotated, the pressure is changed. As the pressure is increased, the spring-loaded plunger 69 is pressed harder against the periphery of the locking aperture 84 in the console body 14 and the looseness or play between the mounting bracket 63 and the console body 14 is decreased. Conversely, as the pressure is decreased, play between the plunger 69 and locking aperture 84 tends to increase. The offset bushing aperture 72 in the upper elastomeric bushing 70 provides means for adjusting the upper elastomeric bushing to vary the play between the console body 14 and the monitor support body 60. As the looseness between the mounting bracket 63 and the console body 14 decreases, the vibrations decrease and the noise level in the vehicle is lessened.

The lower bushings 74 form a limit stop which supports the monitor support body 60 in a downward disposition when the mounting bracket 63 is in the non-use position. Each of the legs 66 on the yoke 65 rests on and is supported by a respective lower elastomeric bushing 74 when the monitor support body 60 is in the non-use position as shown by the dotted lines in FIG. 5. Each of the lower elastomeric bushings 74 can be rotated about their respective mounting pin 73 to adjust the position of the monitor support body 60 when in the non-use position. Therefore, the offset bushing aperture 72 mounted on the mounting pin 73 provides means for adjusting the respective lower elastomeric bushing 74 to adjust the position of the monitor support body 60 in the non-use position.

Referring to the first preferred embodiment of the holder 64 in FIG. 3, means for attaching a computer monitor to the holder comprise mounting holes 85 disposed on the holder 64. The mounting holes 85 are adapted for receiving suitable fasteners to attach a monitor 23 to the holder 64. The number and configuration of the holes 85 in the holder 64 can be altered to accommodate different types of monitors. The back 77 of the holder 64 further includes access openings 80. The access openings 80 provide means for accommodating monitor cables. The access openings 80 are disposed in the back 77 and/or base 76 of the L-shaped holder 64. The overall configuration of the holder 64 can also vary to accommodate different sizes and shapes of monitors.

Figure 9A:
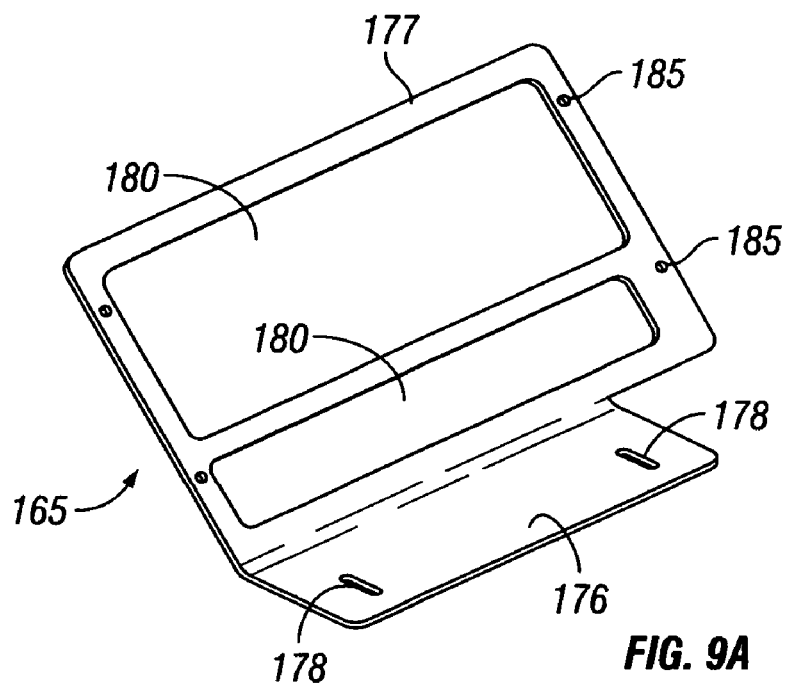
FIGS. 9A-9E are perspective views of respective second, third, fourth, fifth and sixth preferred embodiments of the holder adapted for attachment to a respective mounting bracket.

Referring to FIG. 9A, there is shown a second embodiment of the holder 165 having a generally L-shaped profile formed by a base 176 and a back 177. A plurality of base slots 178 disposed in the base 176 is adapted to receive the base fasteners. The slots 178 and releasable base fasteners cooperate to adjustably secure the holder 165 to the mounting bracket. On the back 177 there are disposed a plurality of mounting holes 185 and access openings 180.

Figure 9B:
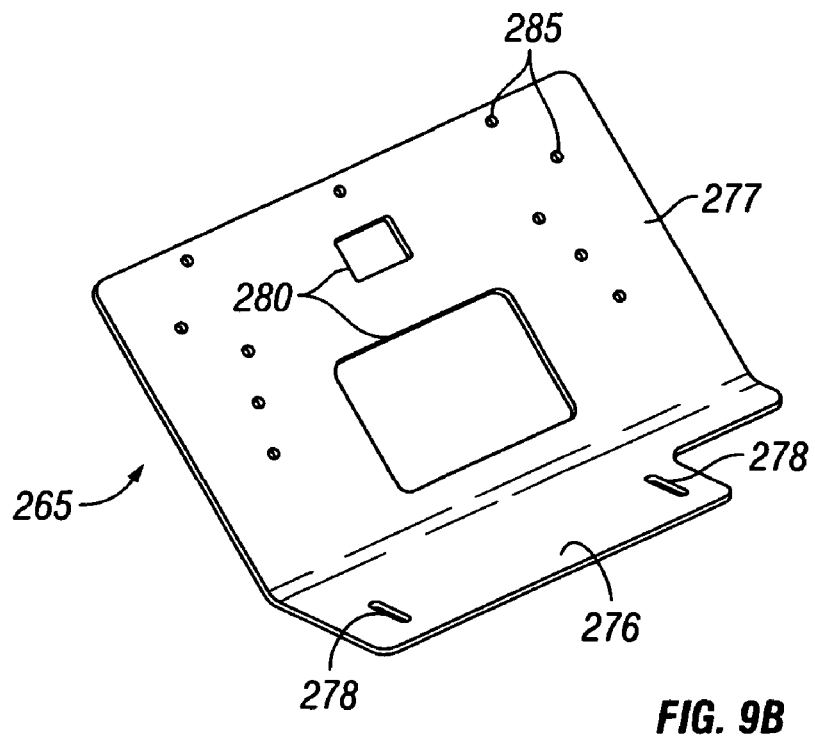

A third preferred embodiment of the holder 265 is shown in FIG. 9B. Similarly, the holder 265 comprises a base 276 and a back 277 having a plurality of mounting holes 285 and access openings 280. A plurality of base slots 278 in the base 276 is adapted for receiving base fasteners to adjustably secure the holder 265 to the mounting bracket.

Figure 9C:
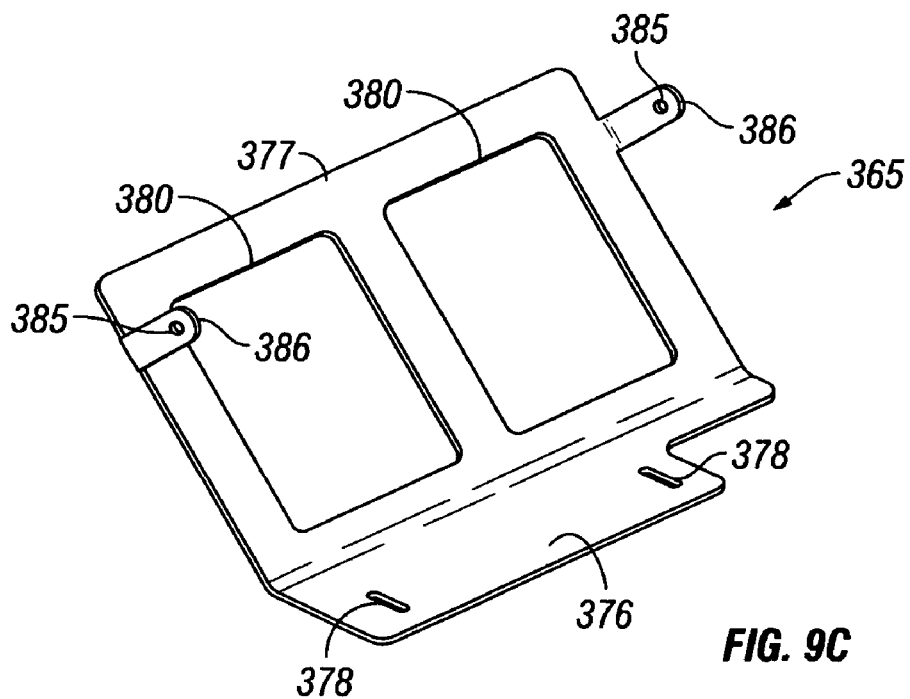

In FIG. 9C, there is shown a fourth embodiment of the holder 365 which comprises a base 376 and a back 377 wherein the base has at least one slot 378. The slot or slots 378 are adapted to receive base fasteners which adjustably attach the holder 365 to the mounting bracket. A pair of tabs 386 extend outwardly from the back 377. Each tab 386 includes at least one mounting hole 385. A plurality of access openings 380 are disposed in the back 377. In this embodiment, the sides of the monitor are attached to the respective tabs 386 on the holder 365 by suitable fasteners.

Figure 9D:
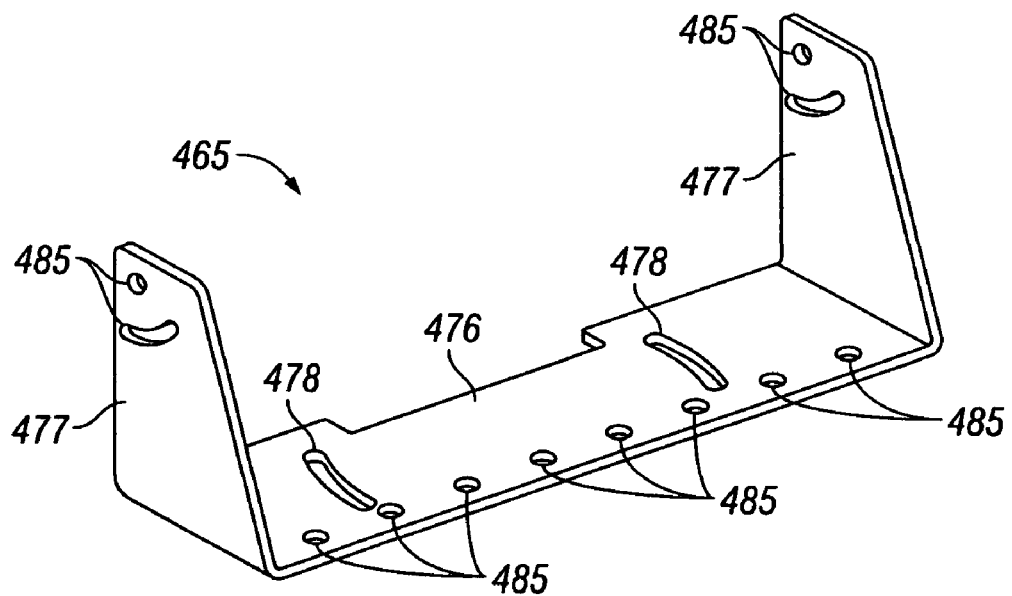

A fifth preferred embodiment of the holder 465 is shown in FIG. 9D. The holder 465 comprises a base 476 and a pair of tabs 477 extending upwardly from the base 476. Mounting holes 485 are disposed in each of the tabs 477 and on the base 476 for mounting a computer monitor thereon. Similar to the fourth embodiment described above, a respective side of the computer monitor is attached to the tabs 477 on the base 476. The base 476 includes a plurality of slots 478 adapted for receiving base fasteners that adjustably mount the holder 465 on the mounting bracket.

Figure 9E:
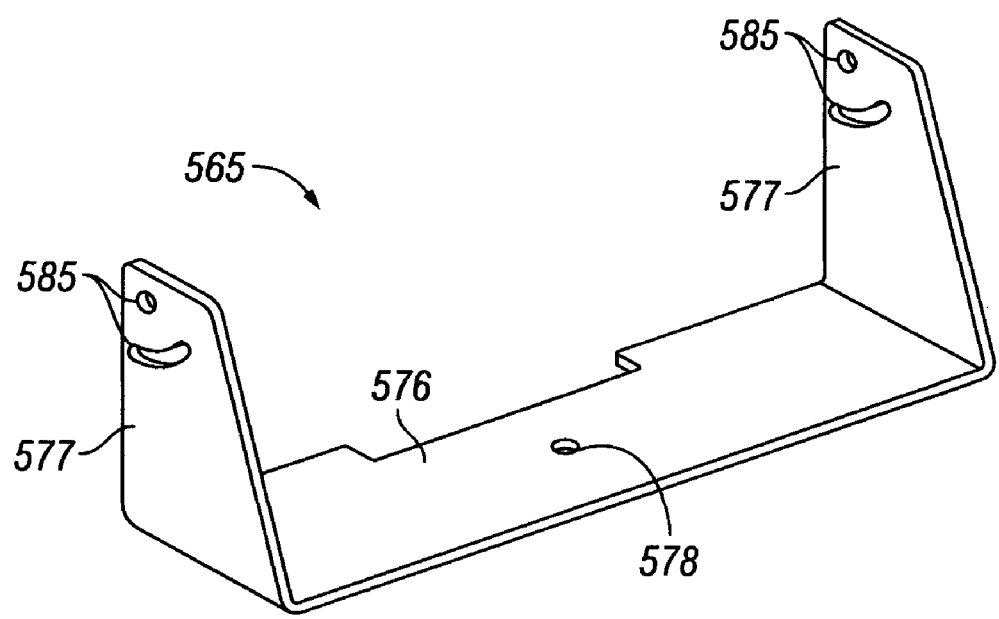

A sixth preferred embodiment of the holder 565 as shown in FIG. 9E discloses a base 576 having a pair of tabs 577 extending upwardly from the base 576. Disposed in each of the tabs 577 are a plurality of mounting holes 585 for securing a monitor to the support device. A mounting aperture 578 is disposed on the base 576. The holder is attached to the mounting bracket by a base fastener.

In the preferred embodiment of FIGS. 1-5, the holder 64 supports the computer monitor 23. The keyboard can be held by the operator or mounted on a separate support not shown in the figures of the present invention. However, a notebook or laptop computer which includes a keyboard could be mounted on the holder 64, if desired. In such case, a separate support for a keyboard would not be required.

Preferably, the console body 14 and the monitor support body 60 are formed from cold-rolled steel, but may be made instead from other suitable materials including plastics, composites, and metals such as aluminum.

When installed in the driver compartment of a vehicle, the console body 14 is preferably adjacent to the dashboard 16. The monitor support body 60 is proximate the dashboard when in the in-use position. The monitor support body 60 and a computer monitor 23 secured thereto may extend above the dashboard 16 in some instances. The support device 12 is in a position substantially forward of a person seated in either of the front seats 18, 20 so that the computer monitor 23 and other equipment positioned on the support device 12 is either in or proximate to the person's forward line of vision. This positioning makes the monitor and other equipment highly visible and readily accessible.

When installed, the support device 12 typically rests on the floor 19 of the vehicle or on a floor mounted bracket support 11. The preferable height of the console body 14 and monitor support body 60 can be varied as desired to suit the particular vehicle.

With the support device 12 installed proximate the dashboard 16, the computer monitor is highly visible and readily accessible. This arrangement also provides for a more efficient use of the space in the driver compartment. The computer monitor is easy to view since it is located forward of the driver. It can be easily pivoted out of the way by the driver or front seat passenger when access to the area of the dashboard behind the computer monitor is desired.

The present invention can be mounted in a car, truck, boat, plane or other desired vehicle, and can be mounted in alternative desired locations within such vehicle.

With the present invention, the two part monitor mounting body allows a mounted monitor to be adjusted to selected viewing angles in order to better accommodate the vehicle occupant's accessibility to the monitor. Also, the computer monitor can be readily moved to its non-use position away from the dashboard when not needed or when full access to the dashboard is desired.

The vibration attenuator decreases the play between the monitor support body and the console body. By reducing the play between these two bodies, relative vibrations are deterred and rattling noises are significantly decreased. Consequently, the support device of the present invention reduces the noise level in the vehicle driver compartment. In addition, wear and tear on the computer monitor and the support device is diminished by the reduction of unwanted vibrations.

The spring-loaded plunger and latch ramp allow the monitor support body to be readily moved into the in-use position. The spring-loaded plunger is preferably located on a side of the support device nearer the driver seat than the passenger seat; however, the spring-loaded plunger could be located on the side of the support device nearer the passenger seat, as well as other desired locations. A quick release of the plunger allows the monitor support body to pivot to another location.

A computer monitor mounted on the support device is highly visible and easily accessible to the driver and front seat passenger when the device is in the in-use position, yet the monitor can be readily moved to an out-of-the-way position by a driver or front seat passenger. In the preferred embodiments wherein the mounting bracket and holder are separate elements, the viewing angle of the monitor and the distance of the monitor from the dashboard can be selectively adjusted.

Furthermore, a computer monitor mounted on the support device is proximate the driver's forward line of sight. The driver need only glance over to directly view the computer monitor. In addition, the proximity of the installed support device to the steering wheel of a vehicle allows the driver to easily reach the monitor and move it when necessary. Therefore, the support device of the present invention allows the monitor to be easily viewed, accessed and operated by the vehicle driver without substantial head movement or upper body movement.

Although the present invention has been described in considerable detail with reference to certain preferred versions thereof, other versions are possible.

The invention claimed is:

1. A support device for mounting a computer monitor in a vehicle, the support device comprising:
   a monitor support body;
   a console body having sides, a top and a bottom wherein said bottom is adapted for securement to the vehicle;
   a pivotal attachment for mounting the monitor support body to the console body; and
   means for deterring vibrations, comprising at least one upper elastomeric bushing disposed on a side of said console body;
   said monitor support body comprising means for holding a computer monitor;
   said support device further comprising an in-use position and a non-use position, wherein in said in-use position, the monitor support body is upwardly disposed and said means for holding a computer monitor is positioned substantially above the top of the console body, and in said non-use position said monitor support body is downwardly disposed, and said means for holding a computer monitor is positioned substantially below the top of the console body.

2. The support device of claim 1 further comprising a releasable lock mechanism to inhibit pivoting of the monitor support body on the console body.

3. The support device of claim 2, wherein said lock mechanism comprises a spring-loaded plunger disposed on the monitor support body and a locking aperture disposed on the console body.

4. The support device of claim 3, wherein said spring-loaded plunger is engaged with said locking aperture when said support device is in the in-use position and said spring-loaded plunger is disengaged from said locking aperture when said support device is in the non-use position.

5. The support device of claim 3, wherein said console body further comprises a latch ramp to facilitate engagement of the spring-loaded plunger with the locking aperture.

6. The support device of claim 5, wherein said latch ramp comprises an angled face extending outwardly from the front of the console body at a location which intersects a pathway of the spring-loaded plunger on the pivoting monitor support body.

7. A support device for mounting a computer monitor in a vehicle, the support device comprising:
a monitor support body;
a console body having sides, a top and a bottom wherein said bottom is adapted for securement to the vehicle;
a pivotal attachment for mounting the monitor support body to the console body; and means for deterring vibrations comprising at least one elastomeric member;
said elastomeric member includes means for adjusting the elastomeric member to vary the play between the console body and the monitor support body;
said monitor support body comprising means for holding a computer monitor;
said support device further comprising an in-use position and a non-use position, wherein in said in-use position, the monitor support body is upwardly disposed and said means for holding a computer monitor is positioned substantially above the top of the console body, and in said non-use position said monitor support body is downwardly disposed, and said means for holding a computer monitor is positioned substantially below the top of the console body.

8. The support device of claim 7, wherein said elastomeric member comprises an upper elastomeric bushing and said means for adjusting the elastomeric member comprising an offset bushing aperture extending through the upper elastomeric bushing at a point offset from a central axis of the upper elastomeric bushing and a mounting pin securing the respective upper elastomeric bushing to the console body.

9. The support device of claim 8, wherein to adjust the upper elastomeric bushing to change the amount of play between the console body and the monitor support body, the at least one upper elastomeric bushing is rotated about the mounting pin.

10. A support device for mounting a computer monitor in a vehicle, the support device comprising:
a monitor support body;
a console body having sides, a top and a bottom wherein said bottom is adapted for securement to the vehicle;
a pivotal attachment for mounting the monitor support body to the console body; and
means for deterring vibrations comprising at least one upper elastomeric bushing and at least one lower elastomeric bushing, wherein said at least one lower elastomeric bushing is positioned on the console body at a location nearer to the bottom of the console body than the at least one upper elastomeric bushing;
said monitor support body comprising means for holding a computer monitor;
said support device further comprising an in-use position and a non-use position, wherein in said in-use position, the monitor support body is upwardly disposed and said means for holding a computer monitor is positioned substantially above the top of the console body, and in said non-use position said monitor support body is downwardly disposed, and said means for holding a computer monitor is positioned substantially below the top of the console body.

11. The support device of claim 10, wherein said at least one lower elastomeric bushing comprises means for adjusting the lower elastomeric bushing to vary the position of the monitor support body.

12. The support device of claim 11, wherein said means for adjusting the lower elastomeric bushing comprising an offset bushing aperture extending through the lower elastomeric bushing at a point offset from a central axis of the lower elastomeric bushing and a mounting pin rotatably securing the respective lower elastomeric bushing to the console body.

13. A support device for mounting a computer monitor in a vehicle, the support device comprising:
a monitor support body for supporting a computer monitor;
a console body for mounting electronic equipment in the vehicle; and
a pivotal attachment for mounting the monitor support body to the console body;
said monitor support body comprises a mounting bracket and a holder, wherein said holder is adjustably mounted on said mounting bracket and said mounting bracket comprises a yoke having a pair of legs adjoined by a cross member and said yoke is attached to said console by said pivotal attachment; and
said support device further comprising an in-use position and a non-use position wherein in said in-use position, the holder of the monitor support body is positioned substantially above the top of the console body and in said non-use position, the holder is positioned substantially below the top of the console body.

14. The support device of claim 13, wherein said pivotal attachment comprises a pair of pivot joints, and each of said legs of the yoke are attached to a respective side of the console body by a pivot joint.

15. A support device for mounting a computer monitor in a vehicle, the support device comprising:
a monitor support body for supporting a computer monitor;
a console body for mounting electronic equipment in the vehicle; and
a pivotal attachment for mounting the monitor support body to the console body;
said monitor support body comprises a mounting bracket and a holder, wherein said holder comprises a generally planar base and a generally planar back, with said base being disposed at an obtuse angle to said back, and said holder is adjustably mounted on said mounting bracket;
said support device further comprising an in-use position and a non-use position wherein in said in-use position, the holder of the monitor support body is positioned substantially above the top of the console body and in said non-use position, the holder is positioned substantially below the top of the console body.

16. The support device of claim 15, wherein said obtuse angle is approximately 108 degrees.

17. The support device of claim 15, wherein said mounting bracket comprises at least one mounting aperture and said base comprises at least one arcuate slot and at least one base fastener which releasably engages the at least one arcuate slot and the at least one mounting aperture to adjustably secure the holder to the mounting bracket.

18. The support device of claim 15, wherein said holder includes a plurality of cable access openings to accommodate equipment cables.

19. The support device of claim 18, wherein said holder further comprises at least one opening for securing the computer monitor to the monitor support body.

20. A support device for mounting a computer monitor in a vehicle, the support device comprising:
a monitor support body for supporting a computer monitor;
a console body for mounting electronic equipment in the vehicle; and a pivotal attachment for mounting the monitor support body to the console body;

a lock mechanism to inhibit movement of the monitor support body on the console body, wherein said lock mechanism comprises a spring-loaded plunger disposed on the monitor support body and a locking aperture disposed on the console body;

said monitor support body comprises a mounting bracket and a holder, wherein said holder is adjustably mounted on said mounting bracket;

said support device further comprising an in-use position and a non-use position wherein in said in-use position, the holder of the monitor support body is positioned substantially above the top of the console body and in said non-use position, the holder is positioned substantially below the top of the console body.

21. The support device of claim 20, wherein said spring-loaded plunger is engaged with said locking aperture when said support device is in the in-use position and said spring-loaded plunger is disengaged from said locking aperture when said support device is in the non-use position.

22. The support device of claim 20, wherein said console body further comprising a latch ramp to facilitate engagement of the spring-loaded plunger with the locking aperture.

23. The support device of claim 22, wherein said latch ramp comprises an angled face extending outwardly from the front of the console body at a location which intersects a pathway of the spring-loaded plunger on the pivoting monitor support body.

24. A support device for mounting a computer monitor in a vehicle, the support device comprising:

a monitor support body for supporting a computer monitor;

a console body for mounting electronic equipment in the vehicle;

a lock mechanism to inhibit movement of the monitor support body on the console body;

at least one snubber for deterring vibrations between the monitor support body and the console body; and a pivotal attachment for mounting the monitor support body to the console body;

said monitor support body comprises a mounting bracket and a holder, wherein said holder is adjustably mounted on said mounting bracket;

said support device further comprising an in-use position and a non-use position wherein in said in-use position, the holder of the monitor support body is positioned substantially above the top of the console body and in said non-use position, the holder is positioned substantially below the top of the console body.

25. The support device of claim 24, wherein said at least one snubber comprises an upper elastomeric bushing.

26. The support device of claim 25, wherein said at least one upper elastomeric bushing includes an offset bushing aperture and mounting pin for adjustably securing the upper elastomeric bushing to the console body.

27. The support device of claim 26, wherein to adjust the upper elastomeric bushing to change the amount of play between the console body and the monitor mounting body, the at least one upper elastomeric bushing is rotated about the mounting pin.

28. The support device of claim 26, wherein said snubber further comprising at least one lower elastomeric bushing.

29. The support device of claim 28, wherein said at least one lower elastomeric bushing comprises an offset bushing aperture extending through the lower elastomeric bushing at a point offset from a central axis of the lower elastomeric bushing and a mounting pin for adjustable securing the respective lower elastomeric bushing to the console body.

30. A support device for mounting a computer monitor in a vehicle having a driver compartment and a dashboard, the support device comprising:

a monitor support body and a console body adapted for attachment to the driver compartment of a vehicle;

said console body having a pair of sides, a top, a bottom, a front and a back;

said front including an opening for mounting electronic equipment therein and said back for engaging the dashboard in the driver compartment;

said monitor support body comprising a holder and a mounting bracket attached to the console body by a pivotal attachment;

said mounting bracket is a U-shaped yoke having a pair of legs adjoined by a cross member;

said cross member including at least one mounting aperture;

said pivotal attachment comprising a pair of pivot joints, wherein each pivot joint includes a pivot pin that extends through a respective leg of the U-shaped yoke and a respective side of the console body; and said holder having a base and a back, wherein said base is disposed at an angle to said back;

said base comprises at least one arcuate base slot and at least one base fastener, wherein said at least one base fastener extends through said at least one arcuate base slot and releasably engages said at least one mounting aperture on said cross member in order to adjustably attach the mounting bracket to the holder;

said holder including at least one opening to attach a computer monitor thereto and a plurality of cable access openings to accommodate equipment cables;

wherein at least one cable access opening is disposed in the back of said holder;

said console body further comprising a lock mechanism which includes a spring-loaded plunger mounted on at least one of the legs of the U-shaped yoke and a locking aperture disposed on a respective side of the console;

said spring-loaded plunger selectively engaging and disengaging the locking aperture;

said console body further comprising a latch ramp including an angled face extending outwardly from the front of the console body at a location which intersects a pathway of the spring-loaded plunger on the pivoting monitor support body;

said U-shaped yoke comprising a pair of notches, wherein each of said notches is disposed on a respective one of said legs;

said support device further comprising a vibration attenuator which includes a plurality of snubbers disposed on the sides of the console body;

said snubbers comprising at least one upper elastomeric bushing and at least one lower elastomeric bushing, wherein said at least one upper elastomeric bushing includes means for adjusting the upper elastomeric bushing to vary the play between the console body and the mounting bracket, and said at least one lower elastomeric bushing including means for adjusting the lower elastomeric bushing to vary the position of the monitor support body;

said support device further comprising an in-use position and a non-use position;

wherein in said in-use position, said holder is positioned substantially above the top of the console body and said spring-loaded plunger is engaged with the locking aperture in the console body, such that the mounting bracket is pressed against the upper at least one upper elastomeric bushing and the at least one upper elastomeric bushing is disposed within one of the notches on the legs of the Y-shaped yoke; and wherein in said non-use position, said monitor support body is downwardly disposed, said holder is positioned substantially below the top of the console body, said cross member of the U-shaped yoke is positioned across a portion of the front of the console body, said spring-loaded plunger is disengaged from the locking aperture and said mounting bracket is engaged with the at least one lower elastomeric bushing.

31. The support device of claim 30, wherein said means for adjusting the at least one upper elastomeric bushing comprises an offset bushing aperture extending through the upper elastomeric bushing at a point offset from a central axis of the upper bushing and a mounting pin disposed in said offset bushing aperture, said mounting pin rotatably securing the upper elastomeric bushing to the console body.

32. The support device of claim 31, wherein said means for adjusting the at least one lower elastomeric bushing comprises an offset bushing aperture extending through the lower elastomeric bushing at a point offset from a central axis of the lower bushing and a mounting pin disposed in said lower bushing aperture, said mounting pin rotatably securing the lower elastomeric bushing to the console body at a location closer to the bottom of the console body than the upper elastomeric bushing.

33. The support device of claim 31, wherein to adjust the upper elastomeric bushing to vary the play between the monitor support body and the console body, the at least one upper elastomeric bushing is rotated about the mounting pin.

34. The support device of claim 32, wherein to adjust the at least one lower elastomeric bushing to adjust the position of the monitor support body in the non-use position, the at least one lower elastomeric bushing is rotated about the mounting pin.

* * * * *